US008564684B2

(12) United States Patent
Bai

(10) Patent No.: US 8,564,684 B2
(45) Date of Patent: Oct. 22, 2013

(54) EMOTIONAL ILLUMINATION, AND RELATED ARRANGEMENTS

(75) Inventor: Yang Bai, Beaverton, OR (US)

(73) Assignee: Digimarc Corporation, Beaverton, OR (US)

(*) Notice: Subject to any disclaimer, the term of this patent is extended or adjusted under 35 U.S.C. 154(b) by 131 days.

(21) Appl. No.: 13/212,119

(22) Filed: Aug. 17, 2011

(65) Prior Publication Data
US 2013/0044233 A1 Feb. 21, 2013

(51) Int. Cl.
H04N 5/228 (2006.01)

(52) U.S. Cl.
USPC ........................................ 348/222.1; 382/118

(58) Field of Classification Search
USPC ........................................ 348/222.1; 382/118
See application file for complete search history.

(56) References Cited

U.S. PATENT DOCUMENTS

| 6,212,502 | B1* | 4/2001 | Ball et al. ...................... 704/270 |
| 6,580,811 | B2* | 6/2003 | Maurer et al. ................ 382/103 |
| 6,590,996 | B1* | 7/2003 | Reed et al. .................... 382/100 |
| 6,714,661 | B2* | 3/2004 | Buddenmeier et al. ....... 382/103 |
| 6,947,571 | B1* | 9/2005 | Rhoads et al. ................ 382/100 |
| 6,990,453 | B2* | 1/2006 | Wang et al. ................... 704/270 |
| 7,359,889 | B2* | 4/2008 | Wang et al. ................... 707/661 |
| 7,874,983 | B2* | 1/2011 | Zancho et al. ................ 600/300 |
| 2004/0001616 | A1* | 1/2004 | Gutta et al. ................... 382/118 |
| 2007/0066916 | A1* | 3/2007 | Lemos .......................... 600/558 |
| 2007/0201725 | A1* | 8/2007 | Steinberg et al. ............ 382/103 |
| 2008/0174570 | A1* | 7/2008 | Jobs et al. ..................... 345/173 |
| 2008/0212831 | A1* | 9/2008 | Hope ............................ 382/103 |
| 2008/0309796 | A1* | 12/2008 | Abe .......................... 348/231.99 |
| 2009/0002178 | A1* | 1/2009 | Guday et al. ................. 340/573.1 |
| 2009/0002512 | A1* | 1/2009 | Suzuki et al. ............... 348/222.1 |
| 2009/0112616 | A1* | 4/2009 | Jung et al. .......................... 705/2 |
| 2009/0118593 | A1* | 5/2009 | Jung et al. ..................... 600/300 |
| 2010/0037187 | A1* | 2/2010 | Kondziela .................... 715/866 |
| 2010/0110265 | A1* | 5/2010 | Akita et al. ............... 348/333.01 |
| 2010/0113950 | A1* | 5/2010 | Lin et al. ....................... 600/509 |
| 2010/0150434 | A1* | 6/2010 | Reed .............................. 382/162 |
| 2011/0007142 | A1* | 1/2011 | Perez et al. ...................... 348/77 |
| 2011/0034176 | A1* | 2/2011 | Lord et al. .................... 455/450 |
| 2011/0058051 | A1* | 3/2011 | Jeon et al. ................. 348/211.11 |
| 2011/0212717 | A1* | 9/2011 | Rhoads et al. ................ 455/420 |
| 2012/0004575 | A1* | 1/2012 | Thorn ............................. 600/587 |
| 2012/0046071 | A1* | 2/2012 | Brandis et al. ............. 455/556.1 |
| 2012/0154633 | A1* | 6/2012 | Rodriguez .............. 348/231.99 |
| 2012/0242818 | A1* | 9/2012 | Chiang et al. ................... 348/77 |

FOREIGN PATENT DOCUMENTS

JP 2008234401 A * 10/2008

OTHER PUBLICATIONS

Stan Z. Li and Anil K. Jain, ed., "Handbook of Face Recognition", 2005, Springer, pp. 247-243 (chapter 11).*
Cohen, et al, "Facial Expression Recognition from Video Sequences: Temporal and Static Modeling," Computer Vision and Understanding 91 (2003), pp. 160-187.*
Robinson, The Emotional Computer, Ninth Int'l Conference on Pervasive Computing, Jun. 2011.*

* cited by examiner

Primary Examiner — Gary C Vieaux
(74) Attorney, Agent, or Firm — Digimarc Corporation

(57) ABSTRACT

A smartphone senses a user's emotional reaction to certain output (e.g., an output from a smartphone's attempt to read a barcode printed in a newspaper). The phone then tailors its operation based on the sensed reaction (e.g., it may turn on a torch to better illuminate the newspaper, or vary image processing or decoding parameters).

3 Claims, 2 Drawing Sheets

EMOTIONAL ILLUMINATION, AND RELATED ARRANGEMENTS

TECHNICAL FIELD

The present technology concerns smartphones and other processor-equipped devices.

BACKGROUND AND INTRODUCTION OF THE TECHNOLOGY

Frown/smile detection is used by some consumer cameras to automatically identify good images. (The technology can be used to trigger image capture when a favorable facial expression is sensed, or to select from among a series of images, to pick a favorable image therefrom. It is sometimes termed a "smile shutter.") See, e.g., US patent publications US20070201725, US20080309796, US20090002512, and US20100110265.

Related technology has also been proposed for games, in which a user's facial expression is sensed, and mimicked on an avatar that corresponds to the user in a game. See, e.g., Microsoft's US2011007142. Neven et al has done related work, shown in U.S. Pat. Nos. 6,580,811 and 6,714,661.

Facial expressions can also be used in conjunction with commercial methods, to sense which ads or products are pleasing (or not) to viewers. See, e.g., US20090118593, US2009112616 and US20040001616.

Motorola has proposed a phone that senses and communicates the user's emotional state, as indicated by facial expressions. See U.S. Pat. No. 7,874,983.

Verizon has suggested tailoring behavior of a user interface based on a user's sensed emotional state. For example, if the user's voice sounds stressed, a phone UI may address the user more slowly. See US20100037187. Related "affective computing" technology is detailed in Microsoft's U.S. Pat. No. 6,212,502, in which the user's emotional state is sensed, and a "help system" user interface responds accordingly. The Microsoft system relies on a Bayesian network to recognize the user's emotion. Additional mood-detecting technology is detailed in Microsoft's US20090002178.

A recent survey of affective computing techniques is provided in Robinson, The Emotional Computer, Ninth Intl Conference on Pervasive Computing, June, 2011.

Separately, smartphones are used to sense machine readable data from physical media. For example, consumers increasingly use smartphones to read QR codes and encoded digital watermarks from posters, magazines and newspapers, in order to link to related content. Such technology is detailed, e.g., in the assignee's U.S. Pat. Nos. 6,947,571, 6,590,996, 20110161076 and 20100150434, and in application Ser. Nos. 13/079,327, filed Apr. 4, 2011, and 13/011,618, filed Jan. 21, 2011.

In accordance with one aspect of the present technology, the LED "torch" (illuminator) of a smartphone is activated when a user seems to be having difficulty using the smartphone to sense machine-readable data. With additional illumination on the object being imaged, the smartphone processor may be better able to decode the encoded information from the captured imagery.

The foregoing and additional features and advantages of the present technology will be more readily apparent from the following description, which proceeds with reference to the accompanying drawings.

DETAILED DESCRIPTION

Figure 1:
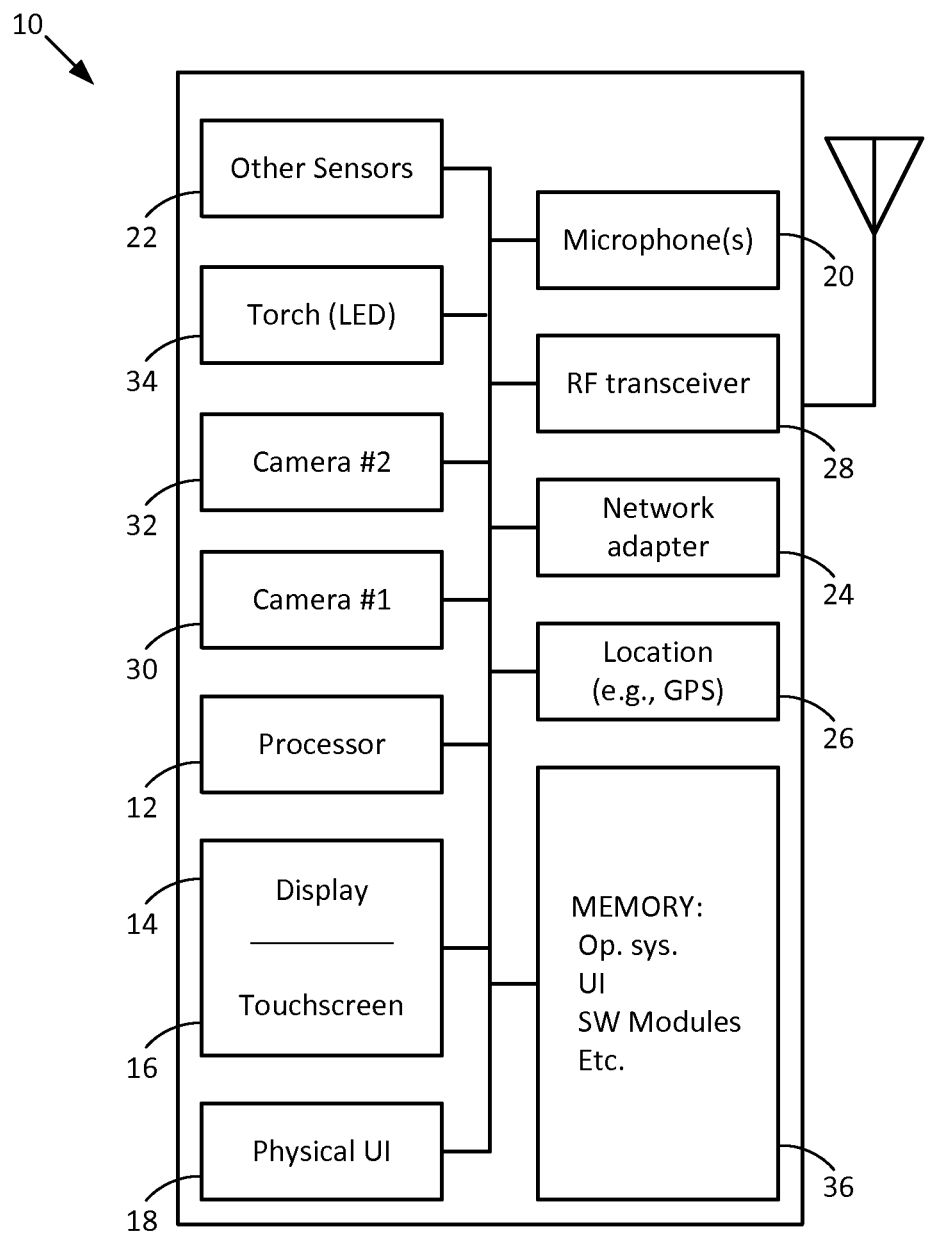
FIG. 1 is a block diagram of an illustrative smartphone.
Figure 2:
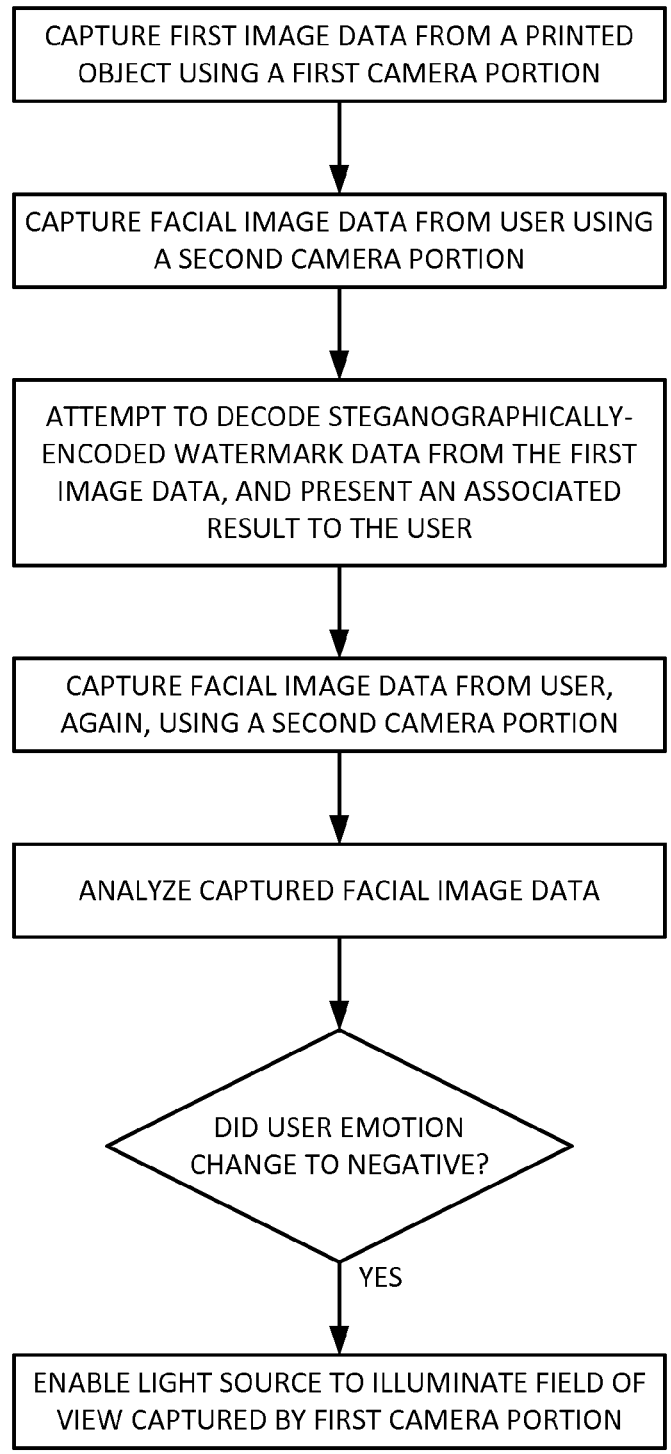
FIG. 2 is a flow chart of a process according to one particular embodiment of the present technology.

Referring to FIG. 1, an illustrative smartphone 10 includes a processor 12, a display 14, a touchscreen 16 and other physical user interface (UI) elements 18 (e.g., buttons, etc.). Also included are one or more microphones 20, a variety of other sensors 22 (e.g., motions sensors such 3D accelerometers, gyroscopes and magnetometers), a network adapter 24, a location-determining module 26 (e.g., GPS), and an RF transceiver 28.

The depicted phone 10 also includes two cameras 30, 32. Camera 30 is front-facing, i.e., with a lens mounted on the side of the smartphone that also includes the screen. The second camera 32 has a lens on a different side of the smartphone, commonly on the back side. The front-facing camera is lower in resolution than the back-facing camera (e.g., 640×480 pixels for the front-facing camera, vs. 1280×720 pixels for the back-facing camera). Accordingly, imagery from the front-facing camera can be processed more simply than imagery from the back-facing camera, with less power consumption and less computational complexity.

Associated with the second camera 32 is an LED "torch" 34 that is mounted so as to illuminate the second camera's field of view. Commonly, this torch is positioned on the same side of the smartphone as the lens of the second camera, although this is not essential.

Smartphone 10 also includes a memory 36 that stores software and data. The software includes both operating system software and application software. The former includes software that controls the user interface. The latter includes content processing software—such as a QR code reader and/or a digital watermark decoder. It similarly may include music recognition software.

In operation, the smartphone captures first image data from a physical object (e.g., a newspaper) using the second (e.g., rear-facing) camera 32. The smartphone then attempts to decode encoded information from the captured imagery (e.g., a QR code or digital watermark). An associated result is presented to the user, e.g., on the smartphone screen 14.

Meanwhile, the smartphone captures imagery of the user's face, from the front-facing camera 30—both before and after the decoding attempt. This facial expression information is analyzed to discern whether an emotion indicated by the user changes negatively. For example, the user's facial expression may change from a neutral expression to a slight frown or grimace. If the smartphone thereby discerns that the user is becoming frustrated with the smartphone, the smartphone processor 36 issues a signal that turns on the torch 34. This torch illuminates the field of view of the camera 32, including the newspaper being imaged.

The increased illumination will often allow the smartphone to extract the encoded information from the imagery captured from the newspaper, when the smartphone was previously unable to do so.

The torch 34 can be extinguished when the processor 36 indicates that a decoding operation has been performed successfully. Alternatively, the torch can be turned-off if imagery captured by the camera 30 reveals a change in the users' facial expression, e.g., from a frown to a neutral expression, or a smile. Still further, the torch can be turned-off based on a time interval—such as 3, 5 or 10 seconds following its enablement. The torch can also be extinguished if the processor senses (e.g., by reference to one of the motion sensors) that the phone has been moved from the pose in which the user was holding it when a negative emotion was sensed, to a different pose—indicating that the user has ceased the attempt to extract information from the object.

Enabling the torch is one action the smartphone can take based on the user's sensed emotion. Alternatively, or additionally, the smartphone can change one or more other parameters. For example, the smartphone may change the focus or zoom of the second camera 32—trying to capture information depicted in a different focal plane. (Such change can be achieved by conventional mechanical arrangements, or by computational photography techniques). Or a different lens aperture or a different exposure interval can be tried. Likewise, different image processing operations may be triggered, such as spatial-domain or frequency-domain filtering, averaging, or analysis in different color planes (or greyscale). Still further, several captured image frames can be combined, such as by averaging, or using high dynamic range combination techniques, in an attempt to obtain imagery from which better recognition results can be obtained.

In a variant embodiment, other facial expressions control other aspects of image processing. For example, the zoom function of camera 32 can be controlled in accordance with eyelid gestures sensed by camera 30 (e.g., with zoom increasing as the user's eyes are opened further). Similarly, changes to the user's lip posture can vary a parameter of operation (e.g., with zoom increasing as the user's lips move apart).

In the detailed arrangement, it will be recognized that the smartphone analyzes camera data to turn on a torch. However, non-obviously, the analyzed camera data is not from the camera 32 with which the torch is associated, but rather is from a camera 30 facing a different direction (towards the user).

The detailed arrangement benefits the user by responding automatically to the user's reflexive reaction to disappointment—without requiring any deliberate action on the user's part. It also conserves battery power, by not energizing the LED unnecessarily.

While described in the context of reading barcode or digital watermark data from a printed object, the technology finds other applications as well. One is in performing OCR-based text recognition. Another is in connection with a pattern-matching operation (e.g., based on extracting characteristic feature data from imagery, such as by SURF). A great variety of other smartphone operations can likewise be altered based on the user's sensed emotional state.

Other Comments

Having described and illustrated the principles of my inventive work with reference to an illustrative example, it will be recognized that the technology is not so limited.

For example, while the detailed embodiment senses mood/emotion by reference to facial image data, other embodiments can use other techniques, e.g., based on voice parameters, heart rate, skin conductivity, and/or other biometrics. (Apple's patent publication 20100113950 details technology for capturing and analyzing EKG data from a user, using a smartphone.) A user's gestures with the phone can also be sensed and analyzed to discern likely emotion (e.g., hard shaking of the device can indicate frustration).

Particular arrangements for recognizing emotions (e.g., joy, sadness, anticipation, surprise, trust, disgust, anger, fear, etc.) from facial imagery are detailed in US20070066916. Other particular arrangements for facial expression analysis are familiar to artisans in the field from publications including Cohen, et al, "Facial Expression Recognition from Video Sequences: Temporal and Static Modeling," Computer Vision and Understanding 91 (2003), pp. 160-187, and from Chapter 11 (Facial Expression Analysis) in the book Handbook of Facial Recognition, Li and Jain, eds., Springer Verlag 2005.

Analysis of the user's emotion typically is based on a "before" and "after" comparison of sampled information (e.g., facial expression data). However, this is not essential. The smartphone can decide to change a parameter of operation (e.g., turn on the torch) based on detection of a frown after the smartphone presents an original processing result (e.g., OCR extraction), regardless of the user's expression before presentation of that result. In some embodiments, a negative emotion may be inferred from the lack of a positive facial expression—or a change from positive facial expression to a neutral facial expression.

Upcoming smartphones will doubtless have stereo cameras for 3D image capture—perhaps both front-facing and back-facing. The availability of stereo imagery of the user's facial expressions allows for more accurate, and nuanced, inferencing of user emotion.

In an illustrative embodiment, a classifier arrangement is used to recognize different emotional states. (A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis to infer an action or state that corresponds to user. A support vector machine (SVM) is an example of a classifier that can be employed.)

While reference has been made to a smartphone-based embodiment, it will be recognized that this technology finds utility with all manner of devices. Game consoles, desktop computers, laptop computers, tablet computers, set-top boxes, televisions, netbooks, wearable computers, etc., can all make use of the principles detailed herein. The term "smartphone" should be construed to encompass all such devices, even those that are not strictly-speaking telephones.

Exemplary smartphones include the Apple iPhone 4, and smartphones following Google's Android specification (e.g., the Verizon Droid Eris phone, manufactured by HTC Corp., and the Motorola Droid 3 phone). (Details of the iPhone, including its touch interface, are provided in Apple's published patent application 20080174570.)

As is familiar to artisans, the processes and arrangements detailed in this specification can be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the description provided herein, e.g., written in C, C++, Visual Basic, Java, Python, Tcl, Perl, Scheme, Ruby, etc. Smartphones according to certain implementations of the present technology can include software modules for performing the different functions and acts.

Different of the functionality can be implemented on different devices. For example, image processing or music recognition operations can involve one or more remote devices, between which execution can be distributed. Extraction of watermark data from image content is one example of a process that can be distributed in such fashion. Another example is image analysis to discern emotion. Thus, it should be understood that description of an operation as being performed by a particular device (e.g., a smartphone) is not limiting but exemplary; performance of the operation by another device (e.g., a remote server), or shared between devices, is also expressly contemplated.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

While detailed in the context of a smartphone that extracts information from imagery, corresponding arrangements are equally applicable to systems that extract information from audio, or from combinations of media.

For example, in connection with a music-recognition app or a speech-to-text app, a user's facial response to the app can be captured by a front-facing camera and—if it turns negative—the device can employ alternate strategies to try and obtain a result that is more user-pleasing. For a music app, one strategy is for the smartphone to attempt to characterize non-music audio captured by the microphone, and then apply a corresponding filter to reduce interference from such audio. Another strategy is to involve nearby smartphones in the detection task, e.g., requesting (such as by Bluetooth) that they sample audio from their locations, and forward captured audio—perhaps after initial processing—to the original smartphone. The original smartphone can then combine such audio with its own captured audio to perhaps increase the signal-to-noise ratio of the music, to which a recognition process can be applied—hopefully with a more pleasing result.

(Music recognition is taught in Shazam's U.S. Pat. Nos. 6,990,453 and 7,359,889.)

More generally, the detailed embodiment may be regarded as employing a first, front-facing camera as a user-feedback sensor device, and employing a second camera as an environment sensor device.

A related embodiment is a variation on the "smile shutter" concept. In this embodiment, a user positions a smartphone so that the second (e.g., rear-facing) camera points towards a desired scene (which is displayed on the phone screen). While prior art smartphone cameras normally require the user to touch the screen to capture an image of the scene, this variant embodiment instead triggers image capture by analyzing imagery from the front-facing camera—looking for a particular facial signal, such as a smile. When the smartphone operator smiles, the second camera takes a picture. It will be recognized that this arrangement avoids the shake problem inherent in the prior art (in which image capture is triggered by the user touching the screen).

To provide a comprehensive disclosure, while complying with the statutory requirement of conciseness, applicant incorporates-by-reference the patents, patent applications and other documents referenced herein. (Such materials are incorporated in their entireties, even if cited above in connection with specific of their teachings.) These references disclose technologies, teachings and systems that can be incorporated into the arrangements detailed herein, and into which the technologies, teachings and systems detailed herein can be incorporated. The reader is presumed to be familiar with such prior work.

In view of the wide variety of embodiments to which the principles and features discussed above can be applied, it should be apparent that the detailed embodiments are illustrative only, and should not be taken as limiting the scope of the invention. Rather, I claim as my invention all such modifications as may come within the scope and spirit of the following claims and equivalents thereof.

I claim:

1. A method comprising:
   (a) capturing first image data from a printed object using a first camera arrangement;
   (b) attempting to decode steganographically-encoded digital watermark data from the captured first image data, and presenting an associated result to a user;
   (c) capturing facial image data from the user, both before and after said attempting, using a second camera arrangement;
   (d) analyzing said captured facial image data to discern that an emotion indicated by the user changed negatively; and
   (e) when such analysis indicates the emotion indicated by the user changed negatively, issuing a signal—from a processor configured to perform such act—that enables a light source for illuminating a field of view towards which the first camera arrangement is directed, said field of view including the printed object;
   (f) wherein the first and second camera arrangements comprise two different camera portions of a smartphone.

2. A phone for use in capturing first image data from an object that is steganographically encoded with digital watermark data, the phone comprising:
   a first camera on a first side of the phone capable of capturing the first image data;
   a light source on the first side of the phone;
   a second camera on a second side of the phone, capable of capturing facial image data from a user of the phone;
   a display;
   a processor; and
   a memory containing stored instructions;
   wherein the first side of the phone is opposite the second side of the phone; and
   wherein the instructions are executable by the processor to cause the phone to:
      capture the first image data using the first camera;
      attempt to decode the steganographically-encoded digital watermark data from the captured first image data;
      present an associated result to the user on the display;
      capture facial image data, both before and after said attempt, using the second camera;
      analyze the captured facial image data from both before and after said attempt, to discern that an emotion indicated by the user changed negatively; and
      activate the light source to illuminate a field of view of the first camera upon a determination by said analyze act that the emotion indicated by the user changed negatively.

3. A non-transitory computer readable medium containing instructions for use with a phone having a first camera and a light source on one side, and a second camera on a second side, wherein said instructions—if executed by a processor in said phone—cause the phone to perform acts including:
  (a) capturing first image data using the first camera;
  (b) attempting to decode steganographically-encoded digital watermark data from the captured first image data, and presenting an associated result to a user;
  (c) capturing facial image data from the user, both before and after said attempting, using the second camera;
  (d) analyzing said captured facial image data to discern that an emotion indicated by the user changed negatively; and
  (e) when such analysis indicates the emotion indicated by the user changed negatively, activating the light source to illuminate a field of view of the first camera.

* * * * *